United States Patent [19]

Taylor

[11] Patent Number: 5,364,310

[45] Date of Patent: Nov. 15, 1994

[54] AGRICULTURAL AND OTHER POWERED EQUIPMENT

[76] Inventor: William Taylor, 55 Letterloan Road, Coleraine, Ireland, BT51 4PP

[21] Appl. No.: 50,094

[22] PCT Filed: Nov. 20, 1991

[86] PCT No.: PCT/GB91/02055

§ 371 Date: May 12, 1993

§ 102(e) Date: May 12, 1993

[87] PCT Pub. No.: WO92/09189

PCT Pub. Date: Jun. 11, 1992

[30] Foreign Application Priority Data

Nov. 22, 1990 [IE] Ireland ................ 9025479

[51] Int. Cl.⁵ ............. A01B 71/08; F16D 3/84; F16C 1/28
[52] U.S. Cl. ................... 464/170; 74/609
[58] Field of Search ............ 464/170, 171, 172; 74/15.61, 15.69, 609, 612; 180/53.1

[56] References Cited

U.S. PATENT DOCUMENTS

| | | | |
|---|---|---|---|
| 1,686,861 | 10/1928 | Kesler | 74/609 |
| 2,903,840 | 9/1959 | Teupel | 57/1 |
| 2,976,703 | 3/1961 | Atkinson | 464/170 |
| 3,797,328 | 3/1974 | Quirk | 74/609 |
| 3,866,440 | 2/1975 | Stananought | 64/18 |
| 4,071,105 | 1/1978 | von Allworden | 180/14.4 |
| 4,107,952 | 8/1978 | Geisthoff | 64/32 F |
| 4,114,529 | 9/1978 | Furmaga | 100/53 |
| 4,663,984 | 5/1987 | Taylor | 74/609 X |
| 4,702,724 | 10/1987 | Vater | 74/609 X |
| 4,747,804 | 5/1988 | Bemzi | 464/170 |

FOREIGN PATENT DOCUMENTS

| | | |
|---|---|---|
| 21620/67 | 5/1967 | Australia . |
| 72305/81 | 1/1982 | Australia . |
| 0311577 | 4/1989 | European Pat. Off. . |
| 1208959 | 2/1960 | France . |
| 1357007 | 2/1964 | France ................ 464/171 |
| 776888 | 6/1957 | Germany . |
| 1217126 | 5/1966 | Germany . |
| 2154839 | 5/1973 | Germany . |
| 3541634 | 5/1987 | Germany . |
| 138602 | 6/1966 | New Zealand . |
| 761389 | 11/1956 | United Kingdom . |
| 799402 | 8/1958 | United Kingdom . |
| 920362 | 3/1963 | United Kingdom . |
| 1194040 | 6/1970 | United Kingdom . |
| 1213466 | 11/1970 | United Kingdom . |
| 2045884A | 11/1980 | United Kingdom . |
| 2116662A | 9/1983 | United Kingdom . |

*Primary Examiner*—Clifford D. Crowder
*Assistant Examiner*—John J. Calvert
*Attorney, Agent, or Firm*—Oliff & Berridge

[57] ABSTRACT

An attachment connector for powered equipment such as a tractor or implement comprises a bearing (11) adapted to be locatable about a PTO output/input stub. The attachment connector may have a base plate portion (10) with a bearing (11) located therein which has a central aperture sized to be closely locatable about a PTO output/input stub of a tractor or implement, the base plate (10) also carrying a tubular portion (12) extending from one face thereof and formed to provide one part of a connector mateable (13) with a further part carried on an attachment, structure being (14) provided to prevent rotation of the base plate (10) and tubular portion (12) with rotation of the PTO output/input stub.

12 Claims, 5 Drawing Sheets

AGRICULTURAL AND OTHER POWERED EQUIPMENT

TECHNICAL FIELD

The invention relates to agricultural and other powered equipment, and more particularly to the attachment of a guard located around a power take-off shaft extending for example between a tractor and a towed or mounted accessory or implement.

BACKGROUND ART

The specification of my European Patent No. 0086606 discloses a flexible guard suitable for location around a power take-off (PTO) shaft extending between a tractor and a towed accessory or implement. Each of the ends of the flexible guard may comprise an end coupling with hook-shaped clamps which cooperate with a raised lip on the tractor or implement housing. Different tractors and different implements housings tend to have different fixing points for the attachment of connectors and therefore a range of such attachment connectors is required to provide cooperating connector portions, to enable attachments such as guards to be connected thereto.

DISCLOSURE OF INVENTION

It is an object of the present invention to obviate or mitigate the above disadvantages.

According to the invention there is provided an attachment connector means which comprises bearing means adapted to be locatable about a PTO output/input stub of a tractor or implement.

In one aspect of the invention there is provided an use. Preferably two chains are provided, one of adjustable length and one of fixed length. The chain or chains may in some circumstances be replaced by wire ropes.

Alternatively, the means for preventing rotation may comprise a prop member carried on the outer surface of the tubular portion and to extend outwardly therefrom with its longitudinal axis transverse to the rotational axis of the bearing. The tubular portion may be cylindrical with the prop member pivotally mounted to lie generally tangentially to the outer surface thereof. Preferably the prop member is pivotally mounted to said outer surface and such mounting may be generally midway along the length of such prop member.

In a further embodiment, the means for preventing rotation may comprise one or more adjustable brackets which are connected to suitable mounting points on the tractor or implement.

With an arrangement in which the tubular portion is cylindrical, such cylindrical member may be slotted in a manner to act as the female portion of a bayonet fitting connector.

A boss member may be locatable within the bearing, such boss member carrying a disc-form member for locating over and protecting the rear surface of the base plate. The disc-form member may be surrounded by a protective collar to prevent objects such as an operator's clothing from contacting the rotating edge of the disc-form member.

An expandable, resilient cylindrical member may be located and retained thereon, for example the sleeve may have external peripheral grooves adapted to receive circlips for locating the bearing. With certain tractors and implements it may be desirable to provide a rearwardly extending tubular guard cover which is secured to the base plate. Such a cover may be rigid, or resiliently expandable.

BRIEF DESCRIPTION OF DRAWINGS

The foregoing and further features of the invention may be more readily understood from the following description of some preferred embodiments thereof, by way of example, with reference to the accompanying drawings, in which.

DETAILED DESCRIPTION OF DRAWINGS

Figure 1:
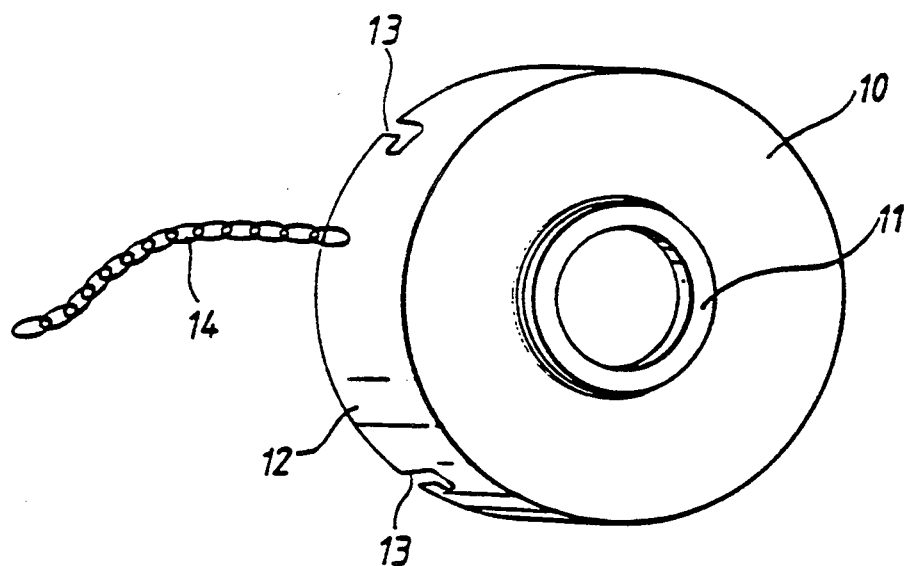
FIG. 1 is a perspective view of a female part of a bayonet connector for attachment to a tractor or implement therefor.

Referring now to FIG. 1 of the drawings there is shown the PTO shaft can then be attached to engage within portion 12 with pins thereon engaging within slots 13. The chain 14 prevents rotation of base plate 10 and portion 12, and hence the guard, with bearing 11 allowing normal rotation of the PTO input/output stub.

Figure 2:
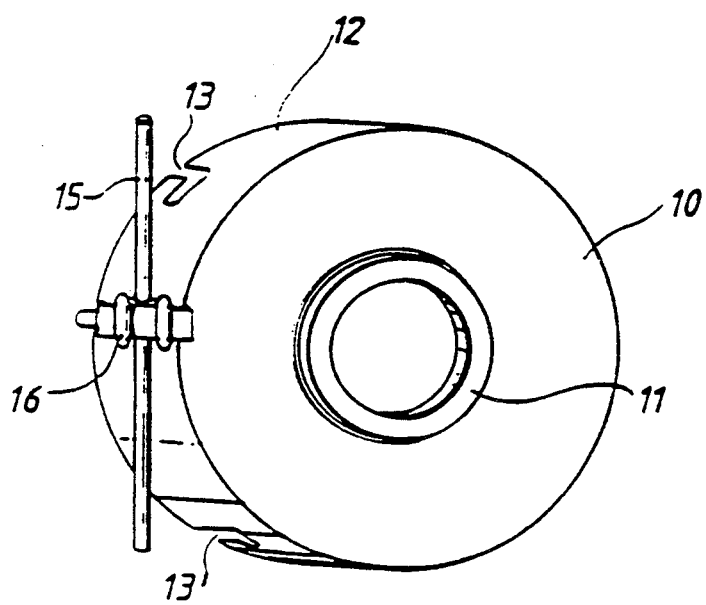
FIG. 2 is a perspective view similar to FIG. 1 of an alternative embodiment.

FIG. 2 shows a similar arrangement to that of FIG. 1 except that the chain 14 is replaced by a prop member 15 which is pivotally mounted at 16 to the portion 12. Although the prop member 15 is shown to be mounted to extend tangentially with portion 12 such prop member may alternatively be mounted to extend generally radially therefrom.

In use, the prop member 15 will engage with any adjacent protrusion on the tractor or implement to prevent rotation of plate 10 and portion 12.

Figure 3:
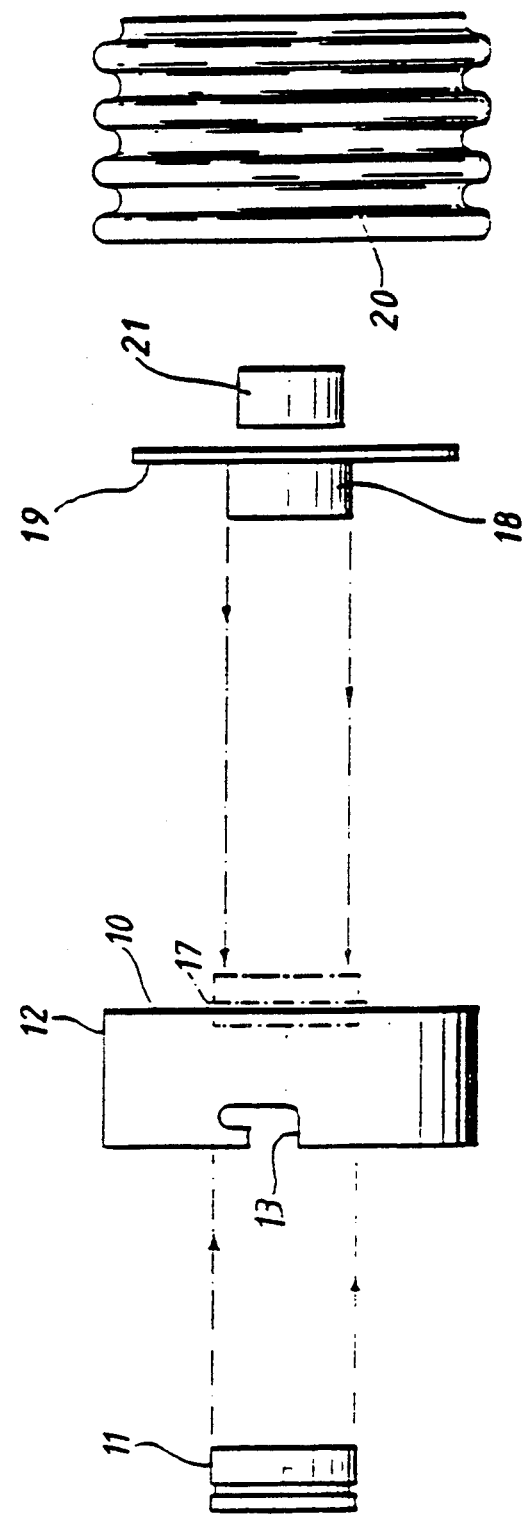
FIG. 3 is an exploded side elevational view of a connector illustrating additional protective features.

Referring now to FIG. 3 there is shown an exploded side elevational view of a connector which may have rotation prevention means such as chain 14 or prop member 15 as shown in FIG. 1 or 2 embodiments. In this arrangement the bearing 11 is retained within a central aperture in base plate 10 by a circlip 17. A disc-form protective insert (not shown) may be located within portion 12 abutting the inner face of plate 10 by the location and fixing of bearing 11. A boss member 18, formed integrally with a disc-form member 19, is located within bearing 11 such that member 19 abuts and protects the rear face of plate 10. the members 18, 19 may be formed of synthetic plastics material, or alternatively formed of metal with the addition of a cylindrical insert 21 of synthetic plastics bolts and screws in appropriate circumstances is not, however, excluded. Although each of the arrangements show a bayonet type fixing any other quick-release fixing may be carried by portion 12 which may then have square or hexagonal cross-section. When it is required to leave the attachment connector located on a tractor or implement when the PTO shaft is not in place, this may be achieved by providing grub screws for firmly locating the bearing 11 on the stub or may be achieved by a dummy yoke end.

Figure 4:
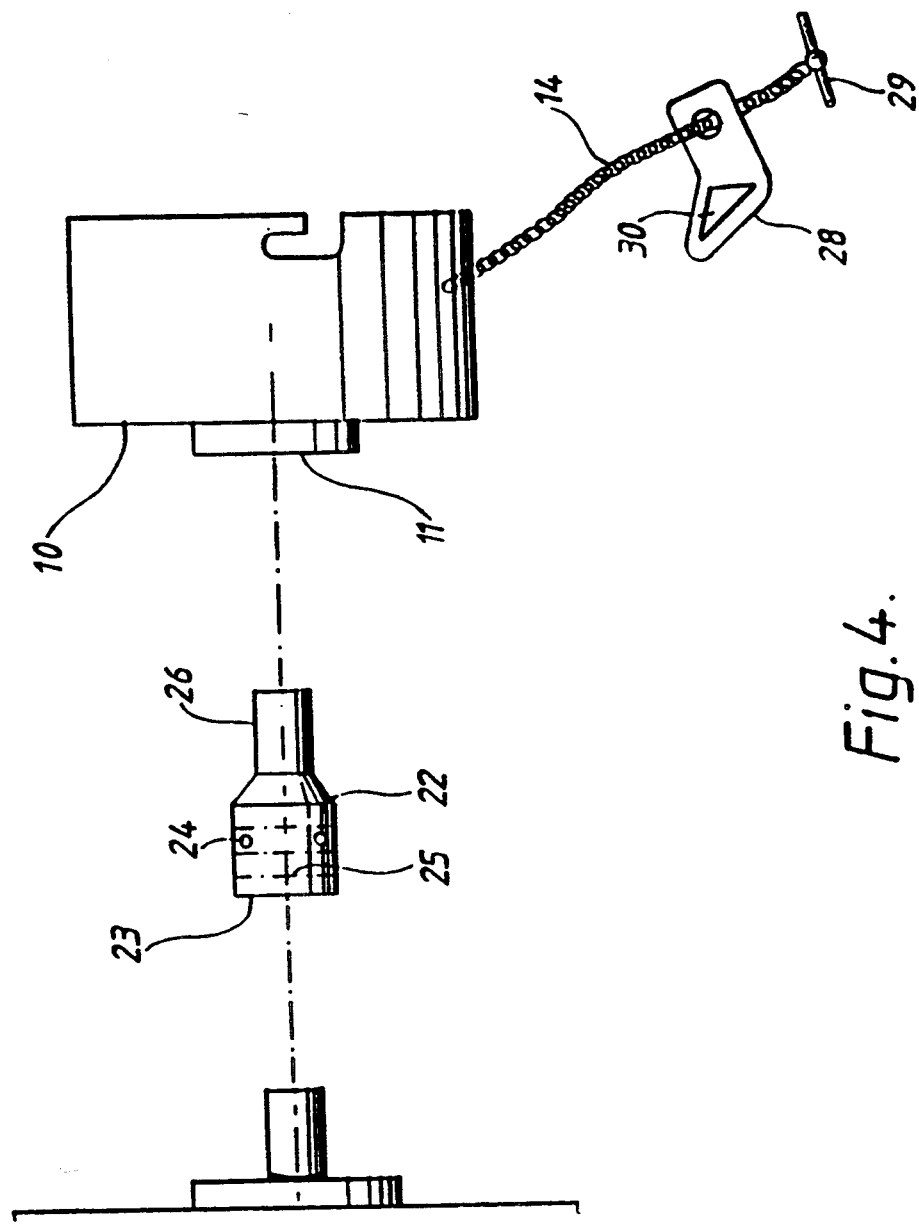
FIG. 4 is an exploded side elevational view of a connector provided with an extension shaft.
Figure 5:
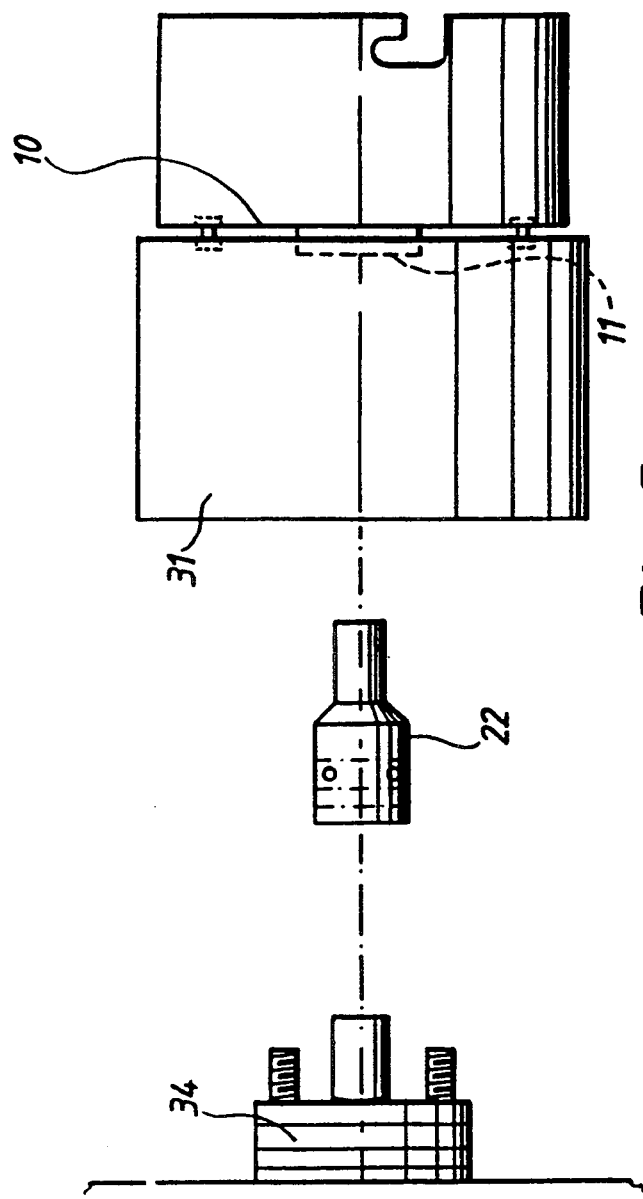
FIG. 5 is an exploded side elevational view of a connector provided with an extension shaft and a rear cover.

Referring now to FIG. 4, this embodiment is of particular use when working with a tractor or implement having a short PTO output/input stub, and mainly applies to older models. In this embodiment the base plate 10 is provided with a bearing 11, which has a central aperture sized to be closely locatable about an extension shaft 22. The extension shaft has a splined sleeve 23 adapted to fit over the PTO output/input stub, and peripherally arranged threaded holes adapted to receive allen screws 24 or an appropriate snap connector will engage with the recess in the splined PTO stub. The extension shaft is thus securely fixed to the PTO stub. The splined sleeve 23 also has external peripheral grooves 25 adapted to receive circlips whereby the bearing 11 can be located and retained on the sleeve. Co-axial and integral with the splined sleeve is a stub extension 26 which is dimensioned so as to engage with the PTO shaft in the normal way. By appropriate placement of the circlips, the bearing 11 can be located on the extension shaft close to the tractor or implement housing, which can obviate the need to provide a disc-form is sized so as to extend from the connector base plate 10 over the slip clutch 34, so that it surrounds the slip clutch with its edge adjacent to the implement housing.

Figure 6:
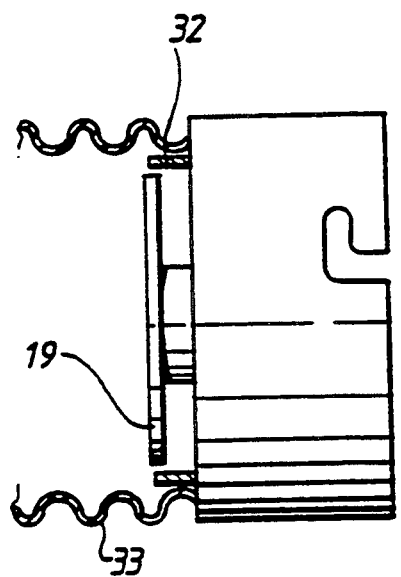
FIG. 6 is a side elevational view partly in section of a connector with a side protector for the disc-form member.

Finally FIG. 6 shows a further embodiment in which the connector is provided with a disc-form protective member 19 and a protective collar 32, mounted off the base plate 10, which serves to prevent objects such as the operator's clothing from contacting the rotating edge of the disc-form protective member. The face of the disc-form protective member is slightly proud of the protective collar 32 so as to perform its function of protecting the rear surface of the base plate 10. If desired, the connector may also be provided with a small flexible guard 33.

Although the invention has been described in connection with the attachment of a guard located around at PTO shaft extending between a tractor and an implement it is not to be construed as limited thereto, and for example it may find application in the attachment of guards for lorry or other heavy vehicle prop shafts and PTO shafts.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

I claim:

1. A connector for a PTO shaft guard attachment, comprising:
a base plate having a bearing located therein, said bearing having a central aperture sized to be closely locatable about a PTO output/input stub of a device, the base plate having a tubular portion extending from one face thereof and formed to provide one part of a connector mateable with a further part carried on an attachment that is separate from the device, and means for preventing rotation of the base plate and tubular portion with rotation of said output/input stub.

2. A connector according to claim 1, wherein said means for preventing rotation comprises one of a chain attached to the connector for attachment to the device, and a prop member carried on an outer surface of the tubular portion and extending outwardly therefrom, said prop member having a longitudinal axis transverse to the axis of rotation of the PTO output/input stub.

3. A connector according to claim 1, wherein said tubular portion is cylindrical, and slotted in a manner to act as a female portion of a bayonet fitting connector.

4. A connector according to claim 1, further comprising a boss member locatable within the bearing, said boss member carrying a disc-form member for locating over and protecting the rear surface of the base plate portion.

5. A connector according to claim 4, further comprising a protective collar, mounted on the base plate portion that prevents objects from contacting a rotating edge of the disc-form member.

6. A connector according to claim 1, further comprising an expandable, resilient cylindrical member located around the tubular portion so as to extend rearwardly of the base plate.

7. A connector according to claim 1, wherein said bearing is anchored within an aperture in the base plate, and a disc-form protective insert is located over the surface of the base plate within the tubular portion.

8. A connector according to claim 1, further comprising an extension shaft extending the PTO output/input stub and secured thereto, wherein the bearing has an aperture sized to be closely locatable about the extension shaft.

9. A connector according to claim 8, wherein the extension shaft comprises a splined sleeve dimensioned to fit over the PTO output/input stub and secured thereto.

10. A connector according to claim 8, wherein the extension shaft is provided with means for locating and retaining the bearing on the extension shaft.

11. A connector according to claim 1, further comprising a rearwardly extending guard cover secured to said base plate.

12. A connector according to claim 11, wherein the guard cover has one of a rigid, and resiliently expandable construction.

* * * * *